(12) United States Patent
Shigeeda

(10) Patent No.: US 8,368,906 B2
(45) Date of Patent: Feb. 5, 2013

(54) PERFORMING A VIRTUAL JOB USING A PLURALITY OF MIXED IMAGE PROCESSING APPARATUSES THAT CAN COMMUNICATE EACH OTHER

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 12/191,911

(22) Filed: Aug. 14, 2008

(65) Prior Publication Data

US 2009/0046314 A1 Feb. 19, 2009

(30) Foreign Application Priority Data

Aug. 15, 2007 (JP) .................................. 2007-211757

(51) Int. Cl.
*G06F 3/12* (2006.01)

(52) U.S. Cl. ................ 358/1.13; 358/1.14; 358/1.15; 358/1.16; 358/444; 702/186; 709/202; 709/205; 709/224; 709/233; 709/234; 710/5; 717/100; 717/125

(58) Field of Classification Search .............. 358/1.15, 358/1.13, 1.14, 1.16, 444; 709/202, 205, 709/224, 233, 234
See application file for complete search history.

(56) References Cited

U.S. PATENT DOCUMENTS

| | | | | |
|---|---|---|---|---|
| 6,188,487 B1 * | 2/2001 | Matsubara | .................... | 358/1.15 |
| 7,039,558 B2 | 5/2006 | Isshiki | | |
| 7,852,502 B2 * | 12/2010 | Horiyama et al. | ........... | 358/1.15 |
| 2004/0036908 A1 * | 2/2004 | Yagita et al. | ................. | 358/1.15 |
| 2006/0215218 A1 * | 9/2006 | Ujigawa | ....................... | 358/1.15 |
| 2006/0268323 A1 * | 11/2006 | Hashimoto | ................... | 358/1.15 |
| 2007/0127055 A1 * | 6/2007 | Kujirai et al. | ................. | 358/1.14 |
| 2007/0273896 A1 * | 11/2007 | Yamamura | ..................... | 358/1.1 |
| 2007/0273915 A1 * | 11/2007 | Nakagawa | .................... | 358/1.14 |
| 2007/0273922 A1 * | 11/2007 | Matsugashita | ............... | 358/1.15 |

FOREIGN PATENT DOCUMENTS

| | | |
|---|---|---|
| JP | 2002-33868 | 1/2002 |
| JP | 2002-033868 A | 1/2002 |
| JP | 2003-263299 A | 9/2003 |
| JP | 2005-038106 A | 2/2005 |
| JP | 2006-72465 | 3/2006 |

\* cited by examiner

*Primary Examiner* — Benny Q Tieu
*Assistant Examiner* — Juan M Guillermety
(74) *Attorney, Agent, or Firm* — Canon U.S.A., Inc. I.P. Division

(57) ABSTRACT

An image processing apparatus configured to acquire a content log of a job including image forming processing which is included in a virtual device that can cooperatively utilize functions of a plurality of image processing apparatuses, the image processing apparatus includes a determination unit configured to determine, in performing a virtual job including image forming processing which is processed by cooperatively using the functions of the plurality of image processing apparatuses included in the virtual device, whether to acquire the content log on the image processing apparatus, and an acquisition unit configured to acquire the content log of the virtual job if the determination unit determines that the image processing apparatus is to acquire the content log, wherein the acquisition unit does not acquire the content log of the virtual job if the determination unit does not determine that the image processing apparatus is to acquire the content log.

9 Claims, 13 Drawing Sheets

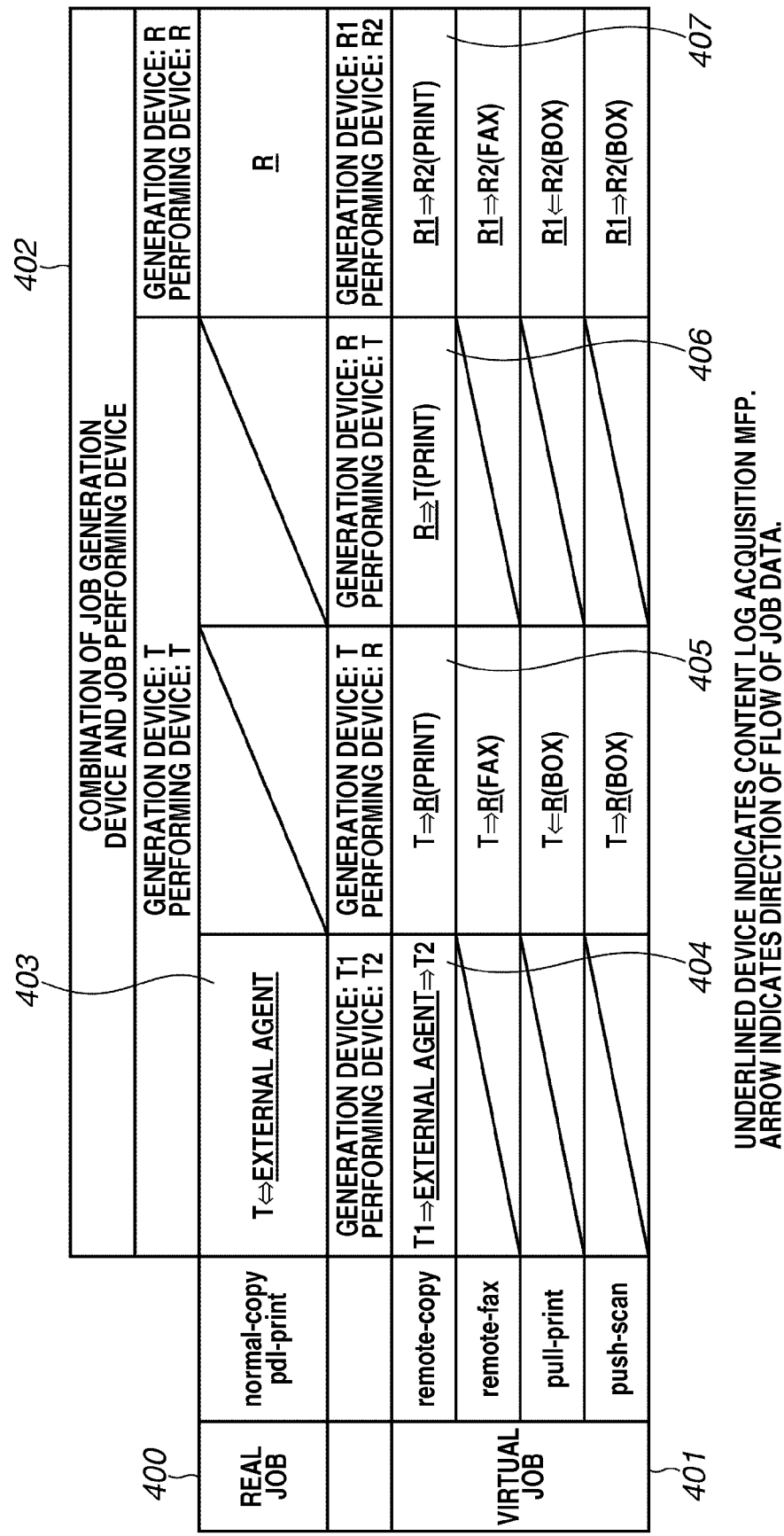

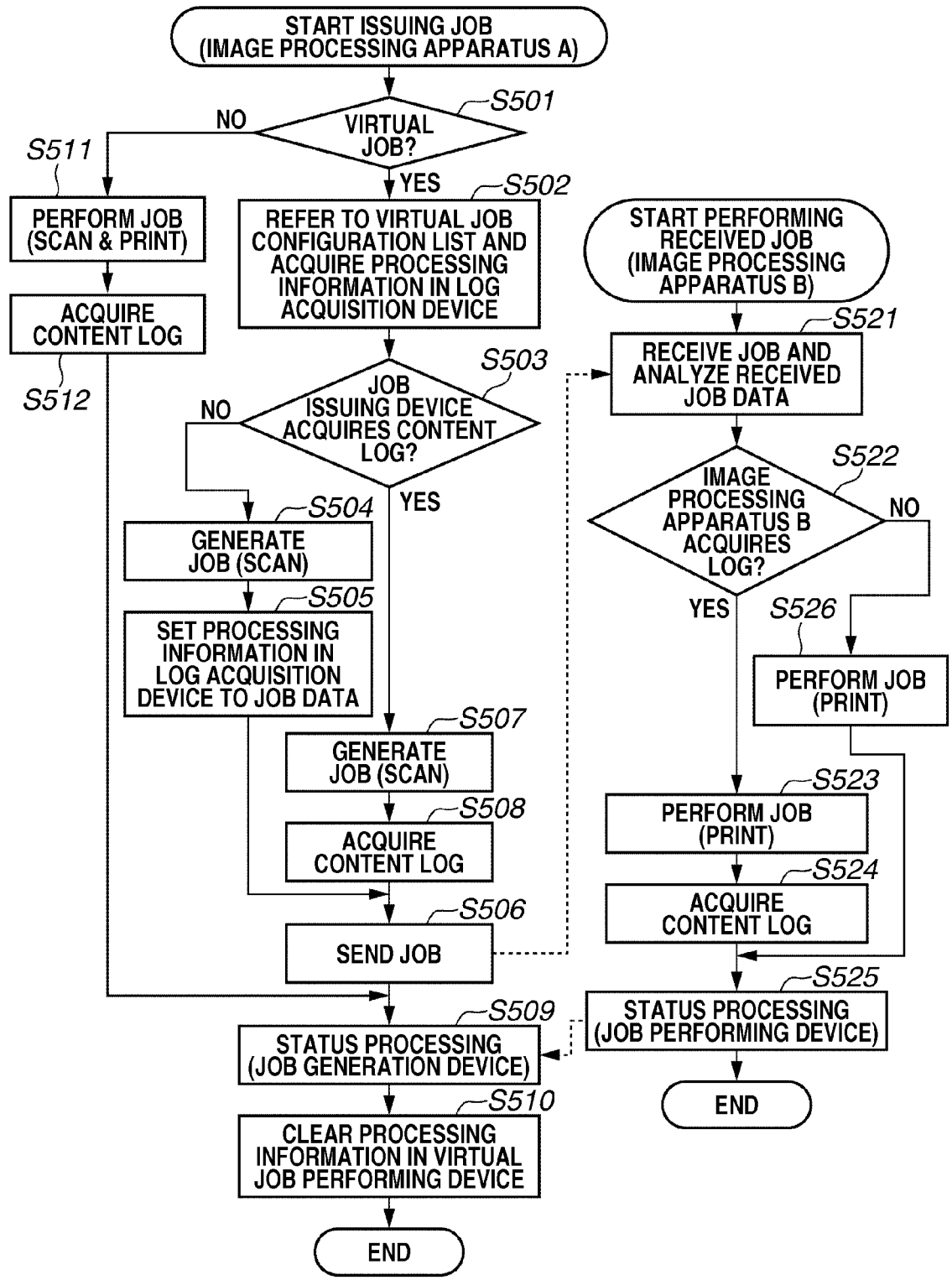

| | | |
|---|---|---|
| JOB HEADER PORTION (700) | PACKET ID | |
| | JOB ISSUING DEVICE ID CODE | Device 01    20c0-5938-2309-a9b0 |
| | JOB LOG | (DELIMITER) |
| | | JOB TYPE    remote-copy |
| | | JOB OWNER    shigeeda |
| | (DELIMITER) | |
| PROCESSING CONTENT PORTION (701) | JOB ISSUING DEVICE ID CODE | Device 03    596b-0901-ad00-f926 |
| | CONTENT LOG ACQUISITION DECLARATION | on |
| | OTHER PROCESSING CONTENTS | OCR |
| | EXPANDED CONTROL AREA | (NULL) |
| JOB DATA PORTION (702) | (DELIMITER) | |
| | DATA AREA | |

FIG.8

800 JOB_LOG

| JOB LOG ID | xxxx-xxxx |
|---|---|
| CONTENT ID | 1123-5678 |
| REGISTRATION DATE AND TIME | 2006:11:13:03:50:23 |
| DEVICE TYPE | MFP-X |
| JOB TYPE | Remote-copy |
| JOB START DATE AND TIME | 2006:11:12:13:34:12 |
| OUTPUT NUMBER OF SHEETS | 3 |
| NUMBER OF COPIES | 1 |
| COMPUTER NAME | PC-A |
| IP ADDRESS | 154.12.224.12 |
| USER NAME | Yamada |
| LOCATION | Office-C |
| | |
| | |

801 IMG_DAT

| CONTENT ID | 1123-5678 |
|---|---|
| IMAGE DATA | |

802 IMG_CHAR

| CONTENT ID | 1123-5678 |
|---|---|
| IMAGE FEATURE AMOUNT | (BINARY) |

803 TXT_DAT

| CONTENT ID | 1123-5678 |
|---|---|
| TEXT DATA | (TEXT DATA) |

FIG.10

STORAGE MEDIUM SUCH AS FD/CD-ROM

| DIRECTORY INFORMATION |
|---|
| PROGRAM CODE CORRESPONDING TO STEPS IN FLOW CHART OF FIG. 5 |
| PROGRAM CODE CORRESPONDING TO STEPS IN FLOW CHART OF FIG. 9 |
| |
| |
| |
| |
| |

FIG.11

STORAGE MEDIUM SUCH AS FD/CD-ROM

| DIRECTORY INFORMATION |
|---|
| PROGRAM CODE CORRESPONDING TO STEPS IN FLOW CHART OF FIG. 4B |
| |
| |
| |
| |
| |
| |

PERFORMING A VIRTUAL JOB USING A PLURALITY OF MIXED IMAGE PROCESSING APPARATUSES THAT CAN COMMUNICATE EACH OTHER

BACKGROUND OF THE INVENTION

1. Field of the Invention

The present invention relates to an information processing system configured to perform a virtual job using combination of a plurality of image processing apparatuses that can communicate with one another via a network.

2. Description of the Related Art

In recent years, leakage of corporate confidential information to the outside by printing, copying, or facsimile transmission for unauthorized use has been a serious social issue.

In order to establish internal control over business operations and prevent such unauthorized use from occurring, a conventional content log management system which acquires, stores, and later monitors every operation history and data processing of office equipments used in performing business operations has been developed.

With a content log management system like this, business managers and administrators can monitor the business operations performed by employees and content data thereof in an image information apparatus installed in their offices. Further, the employees know that their business operations are monitored by the content log management system so that it can be expected that an insider including the employee is deterred from participating in criminal activities.

Meanwhile, office equipments that perform printing, copying, and facsimile transmission have greatly improved with a recent progress in the digital image processing techniques. For example, a multifunction peripheral (MFP) which can perform multiple functions of image processing has been developed. Further, such image processing apparatuses can be connected to a network such as an intranet.

Furthermore, a large capacity hard disk drive (HDD) is provided on the MFP. Document data to be printed and image data scanned for copying is stored in a predetermined area (hereinafter referred to as a "Box") of the HDD and can be separately reused afterwards. In addition, a network-connection function is usually provided to the MFP as its standard function. Thus, an increasing number of offices are using a broadband network.

Under such circumstances, in a conventional image processing system, convenience of office equipments is improved using a plurality of MFPs operating in cooperation with one another via a network.

Such an image processing system uses, in performing a copy job, a function for scanning an image on one MFP and transferring the scanned image to another MFP via the network to print the scanned image on the receiving MFP. When a plurality of MFPs of an image processing system distributed on a network is virtually used as single office equipment, each MFP is collectively referred to as a "virtual device".

A virtual device is useful in the following point. A virtual device can improve locational convenience of an MFP installed in an office and an MFP having a relatively low-level function can utilize optional functions such as a finisher and a facsimile transmission. Thus, a job conventionally performed by a high-performance MFP can also be performed similarly on a virtual device as a virtual job.

The above-described conventional method can perform a so-called "virtual copy". With the virtual copy technique, various finishing processing such as two-sided printing and stapling can be implemented according to functions of an MFP that performs the actual printing.

Japanese Patent Application Laid-Open No. 2006-72465 discusses a method for preventing a secure print from being set in a case where an electronic document is sent from a client apparatus to a printer apparatus and security is set for the electronic document itself.

Japanese Patent Application Laid-Open No. 2002-33868 discusses a method in a remote copy system that prevents duplicated charging by determining whether charging processing has been performed on either a scanner and a printer.

In the above-described image processing system, it is necessary to operate the above-described content log management system also on the virtual devices in order to monitor each and every content data processed in business operations performed by users of the virtual device.

On the other hand, according to the conventional method, the following problems may occur when a content log stored on the virtual device is acquired.

The conventional method acquires a content log during scanning of an original document with the MFP and also acquires a content log of printing of the document on the MFP that receives and prints the scan data. The series of processing are merely performed as virtual copy processing on the virtual device. However, the conventional method acquires a content log twice, namely, at the time of scanning the original document and at the time of printing the scanned document.

Basically, in a content log management system, it is enough to record information about who processed which document having what content where and when. Accordingly, it is enough to acquire a content log only once for each job. If a content log is acquired twice, duplicated content logs may exert pressure on an area of the HDD that stores data. Further, the load on the network for transferring the content data may become large.

Thus, a user who manages and operates the system may suffer unnecessary increase of system management costs.

Meanwhile, Japanese Patent Application Laid-Open No. 2006-72465 discusses a technique that prevents duplicated setting of security for electronic document printing. Furthermore, Japanese Patent Application Laid-Open No. 2006-72465 discusses a method for determining whether to apply security information which is dually set, in a job receiving apparatus.

If the method discussed in Japanese Patent Application Laid-Open No. 2006-72465 is applied to acquisition of a duplicated content log in the virtual devices, a content log may not be acquired when it is necessary to perform the acquisition of the content log in a virtual job sending apparatus. This is because the performance of the image processing apparatus such as a data processing speed or a capacity for temporarily storing content data affects the acquisition of a content log and thus it may become necessary to previously acquire a content log on the virtual job sending apparatus.

Further, a data server may degenerate duplicated data after doubly acquiring a content log. However, a load on a network cannot be reduced in this case because the content data is dually transmitted.

SUMMARY OF THE INVENTION

The present invention is directed to a mechanism for preventing a duplicated acquisition of a content log in each image processing apparatus that performs a virtual job.

According to an aspect of the present invention, an image processing apparatus configured to acquire a content log of a job including image forming processing which is included in a virtual device that can cooperatively utilize functions of a plurality of image processing apparatuses includes a determination unit configured to determine, in performing a virtual job including image forming processing which is processed by cooperatively using the functions of the plurality of image processing apparatuses included in the virtual device, whether to acquire the content log on the image processing apparatus, and an acquisition unit configured to acquire the content log of the virtual job if the determination unit determines that the image processing apparatus is to acquire the content log, wherein the acquisition unit does not acquire the content log of the virtual job if the determination unit does not determine that the image processing apparatus is to acquire the content log.

According to another aspect of the present invention, a method for controlling an image processing apparatus configured to acquire a content log of a job including image forming processing which is included in a virtual device that can cooperatively utilize functions of a plurality of image processing apparatuses includes determining, in performing a virtual job including image forming processing which is processed by cooperatively using the functions of the plurality of image processing apparatuses included in the virtual device, whether to acquire the content log on the image processing apparatus, and not acquiring the content log of the virtual job if the content log is determined not to be acquired by the image processing apparatus and acquiring the content log of the virtual job if the content log is determined to be acquired by the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4A illustrates an example of a job configuration list managed by a device management computer illustrated in FIG. 1.

FIG. 5 is a flow chart illustrating an example of data processing performed by an image processing apparatus according to an exemplary embodiment of the present invention.

FIG. 8 illustrates an example of a content log managed by a content log management server illustrated in FIG. 1.

FIG. 10 illustrates an example of a memory map of a storage medium that stores various types of data processing programs and can be read by the image processing apparatus according to an exemplary embodiment of the present invention.

FIG. 11 illustrates an example of a memory map of a storage medium that stores various types of data processing programs and can be read by the information processing apparatus according to an exemplary embodiment of the present invention.

DESCRIPTION OF THE EMBODIMENTS

Various exemplary embodiments, features, and aspects of the present invention will be described in detail below with reference to the drawings. It is to be noted that the relative arrangement of the components, the numerical expressions, and numerical values set forth in the embodiments are not intended to limit the scope of the present invention.

First Exemplary Embodiment

Figure 1:
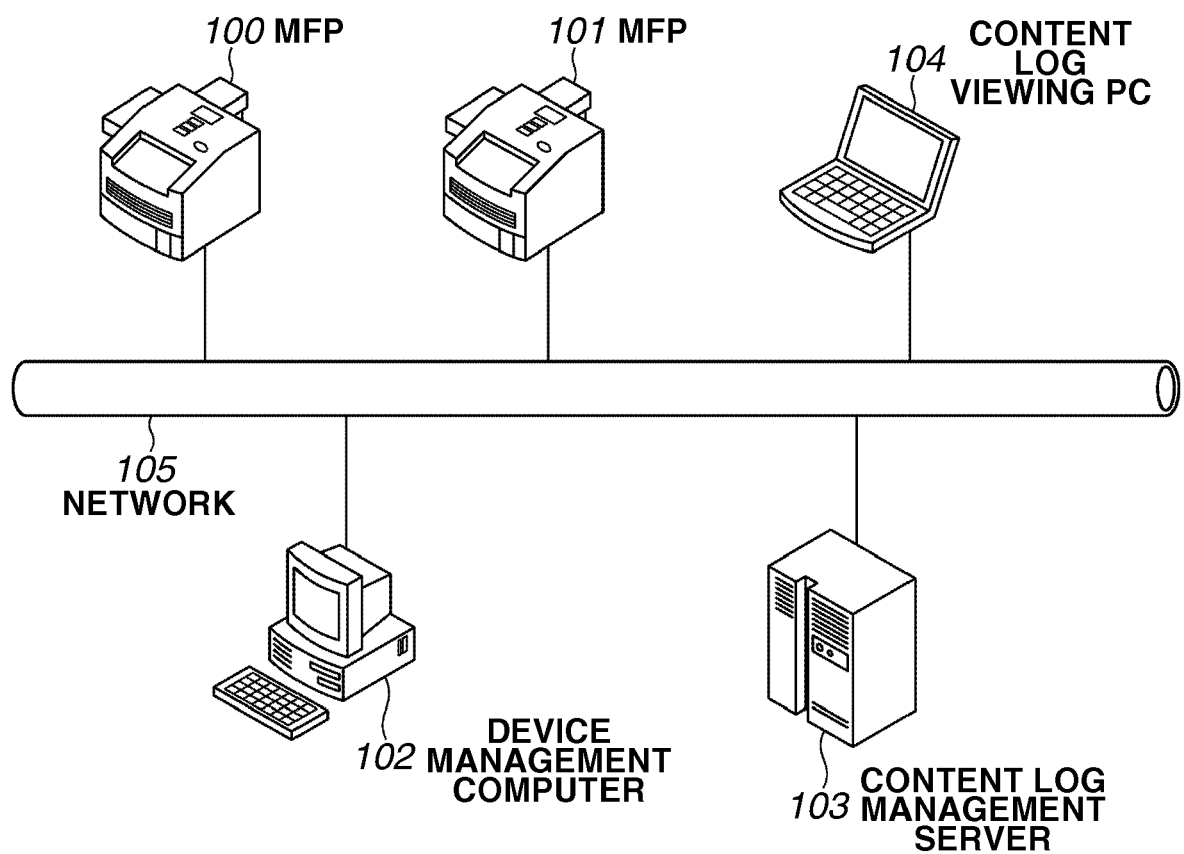
FIG. 1 illustrates an example of an image processing system to which an image processing apparatus according to a first exemplary embodiment of the present invention can be applied.

FIG. 1 illustrates an example of an image processing system to which an image processing apparatus according to the first exemplary embodiment of the present invention can be applied. In the system, the image processing apparatus, an information processing apparatus, and a server each of which is constituted by a plurality of MFPs via a network, can communicate with one another.

Here, the information processing apparatus includes a device management computer 102, a content log management server 103, and a content log viewing personal computer (PC) 104, which are described below.

Further, the image processing apparatus includes a function for acquiring a content log of a job when performing a job including image forming processing.

Referring to FIG. 1, an MFP 100 includes a scan function, a print function, a facsimile transmission function, and a network function. The MFP 100 is connected to a network 105 provided in an office.

Moreover, the MFP 100 uses these functions in combination and performs digital image processing to implement processing, such as copying, network printing, and sending a scanned image via an e-mail.

Furthermore, the MFP 100 includes a BOX function for storing image data on a hard disk drive (HDD) of the MFP 100. The data stored in a box can be reused.

An MFP 101 is a digital MFP substantially similar to the MFP 100. However, the MFP 101 has a hardware resource configuration different from the MFP 100. The MFP 101 is an inexpensive version of the MFP 100 whose functions are partly simplified in comparison with the MFP 100. For example, the capacity of the HDD of the MFP 101 is smaller than that of the MFP 100. Further, the MFP 101 does not have a facsimile transmission function. Thus, compared to the MFP 100, the MFP 101 has limited functions such that the number of boxes to store image data is smaller than the MFP 100 and that facsimile transmission is not possible.

The device management computer 102 manages the image processing apparatuses (the MFPs 100 and 101 and a printer) connected to the network 105. The device management computer 102 includes a function for managing a combination of virtual devices for implementing a virtual job (hereinafter referred to as a "virtual job configuration list").

The device management computer 102 searches the network 105 in the office for the image processing apparatus connected to the network 105 and functions thereof (hereinafter referred to as "device information"). The device information is stored on the device management computer 102.

A system administrator accesses the device management computer 102, refers to the device information previously acquired by the search, and determines a configuration of a device performing a virtual job for each virtual job.

The configuration of the image processing apparatus is a virtual device configuration for a predetermined virtual job, and is stored on the device management computer 102 as a job configuration list illustrated in FIG. 4A.

When the MFP 100 and the MFP 101 receive a device configuration list of a virtual job distributed from the device management computer 102, the MFP 100 and the MFP 101 store the received device configuration list in an internal storage area.

The content log management server 103 stores a content log sent from the MFP 100 and the MFP 101.

Here, a content log includes job attribute information for each job issued to the MFP 100 and the MFP 101 by a user and image data printed or sent during the job or predetermined data extracted from image data. A job includes a copy job, a print job, and a facsimile transmission job.

The predetermined data extracted from image data includes text data extracted by character recognition processing and an image feature amount used for searching an image. The content log is acquired by the image processing apparatus in the unit of a job.

The content log management server 103 receives a content log and stores the received content log in an external mass storage device. When the content log management server 103 receives a content log, another image processing server (not illustrated) performs necessary image processing (resolution conversion) and data format conversion processing.

The image processing server is installed to perform standardization of image resolutions and a data format differing according to types of image processing apparatus, and distribution of processing loads.

The content log stored on the content log management server 103 can be searched for and viewed from the content log viewing PC 104. The system administrator can utilize the content log viewing PC 104 to search and view information about who (user of the image processing apparatus) has issued which type of job on which image processing apparatus and acquired what image data relating to the job on the content log viewing PC 104 later.

Figure 2A:
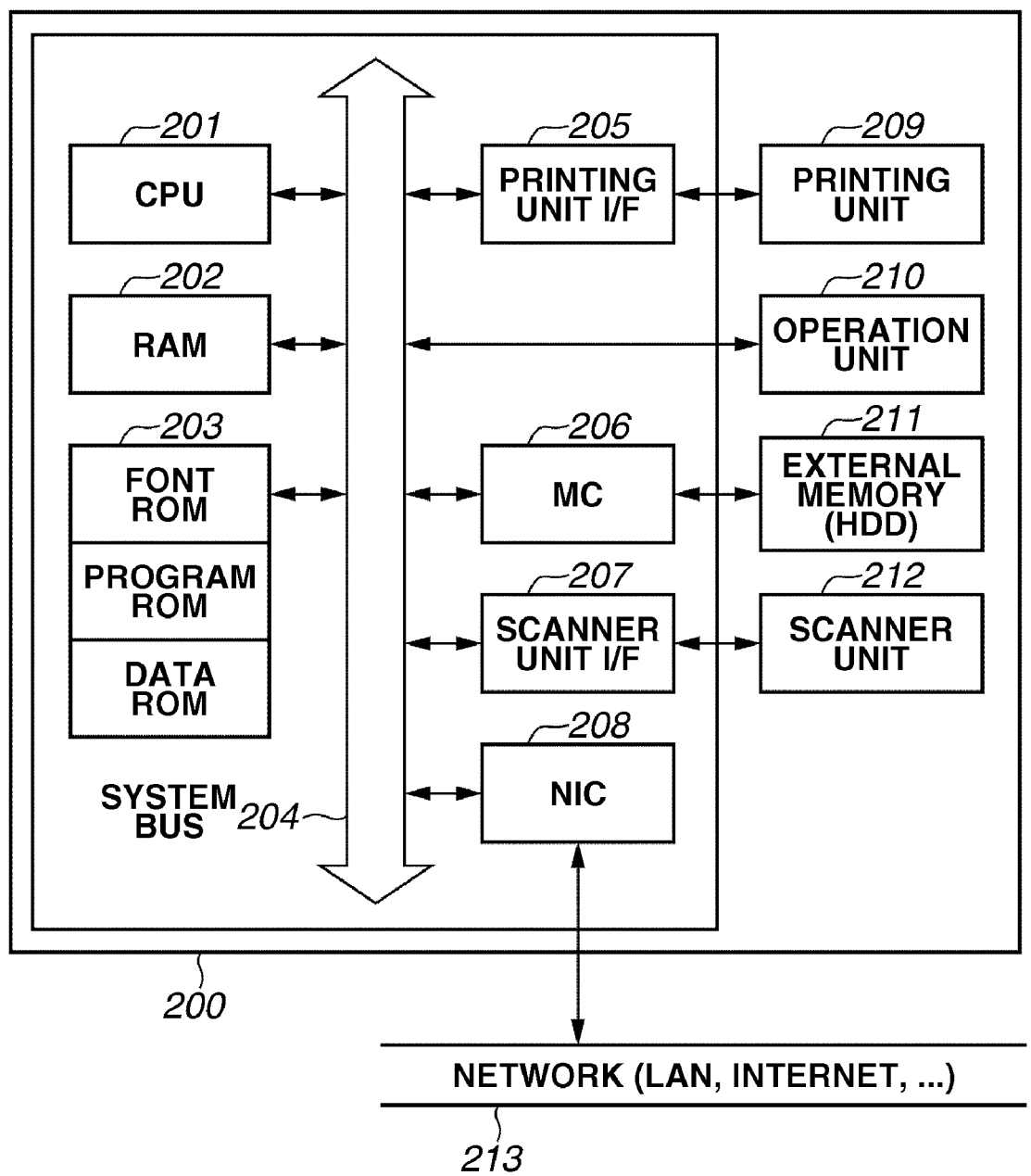
FIG. 2A illustrates an example of a hardware configuration of an MFP in the image processing system illustrated in FIG. 1.

FIG. 2A illustrates an example of a hardware configuration of each of the MFP 100 and the MFP 101 in the image processing system illustrated in FIG. 1.

Referring to FIG. 2A, an image processing apparatus 200 includes a central processing unit (CPU) 201. The CPU 201 executes software stored on a read-only memory (ROM) 203 or an external memory 211, for example. The CPU 201 entirely controls each block connected to a system bus 204.

An image signal generated by the CPU 201 is output to a printing unit (image forming engine) 209 as output information via a printing unit interface (I/F) 205.

A random access memory (RAM) 202 functions as a main memory and a work area for the CPU 201. A memory controller (MC) 206 controls an access to the external memory 211. The external memory 211 stores font data, an emulation program, and image data.

An operation unit 210 includes a switch and a light-emitting diode (LED) display device for user operation. A scanner unit I/F 207 performs a correction, image processing, and editing on image data received from a scanner unit 212.

When the user issues an instruction for reading an image of a document from the operation unit 210, the CPU 201 issues a document reading instruction to the scanner unit 212.

A network interface card (NIC) 208 bidirectionally sends and receives data to and from other network apparatuses or file servers via a network 213 (equivalent to the network 105 in FIG. 1). The sent and received data via the network 213 includes print image data and the above-described virtual job configuration list. The external memory 211 can temporarily store information during the processing.

The CPU 201 performs traffic control of the data communication performed via the system bus 204. The CPU 201 controls a path of a data flow as follows according to an operation in the image processing apparatus 200.

In a case of using a copy function of the image processing apparatus 200, the CPU 201 controls the path of the data flow from the operation unit 210, to the scanner unit 212, to the scanner unit I/F 207, to the printing unit I/F 205, and to the printing unit 209.

In a case of using a network printing function of the image processing apparatus 200, the CPU 201 controls the path of the data flow from the NIC 208, to the printing unit I/F 205, and to printing unit 209.

In a case of using a send function of the image processing apparatus 200, the CPU 201 controls the path of the data flow from the operation unit 210, to the scanner unit 212, to the scanner unit I/F 207, and to the NIC 208.

In a case where image data stored on the external memory 211 is used, for example, in substitution for a scanned image, the scan processing (sending the data from the scanner unit 212 to the scanner unit I/F 207) is replaced with image data reading processing (sending data from the external memory 211 to the MC 206).

In a case where image data is stored on the external memory 211 instead of performing printing processing on the image data, the printing processing (sending data from the printing unit I/F 205 to the printing unit 209) is replaced with image data storage processing (sending data from the MC 206 to the external memory 211). The above-described image data reading and storage function is referred to as a BOX function.

With respect to the data flow in a case of performing a virtual job, the above-described data flow is distributed to and performed by each image processing apparatus constituting the virtual device.

Here, a virtual device performs a data flow pass control similar to that described above. In a case of performing copy processing on the virtual device, the following data flow path control is performed.

In a case where the image processing apparatus 200 generates a virtual job, the CPU 201 controls a data flow path from the operation unit 210, to the scanner unit 212, to the scanner unit I/F 207, and then data is sent.

In a case where the image processing apparatus 200 performs a virtual job, the CPU 201 controls a data flow path from receiving data, to the printing unit I/F 205, and to the printing unit 209. Processing for generating and performing a virtual job and a control of the flow will be described below.

Figure 2B:
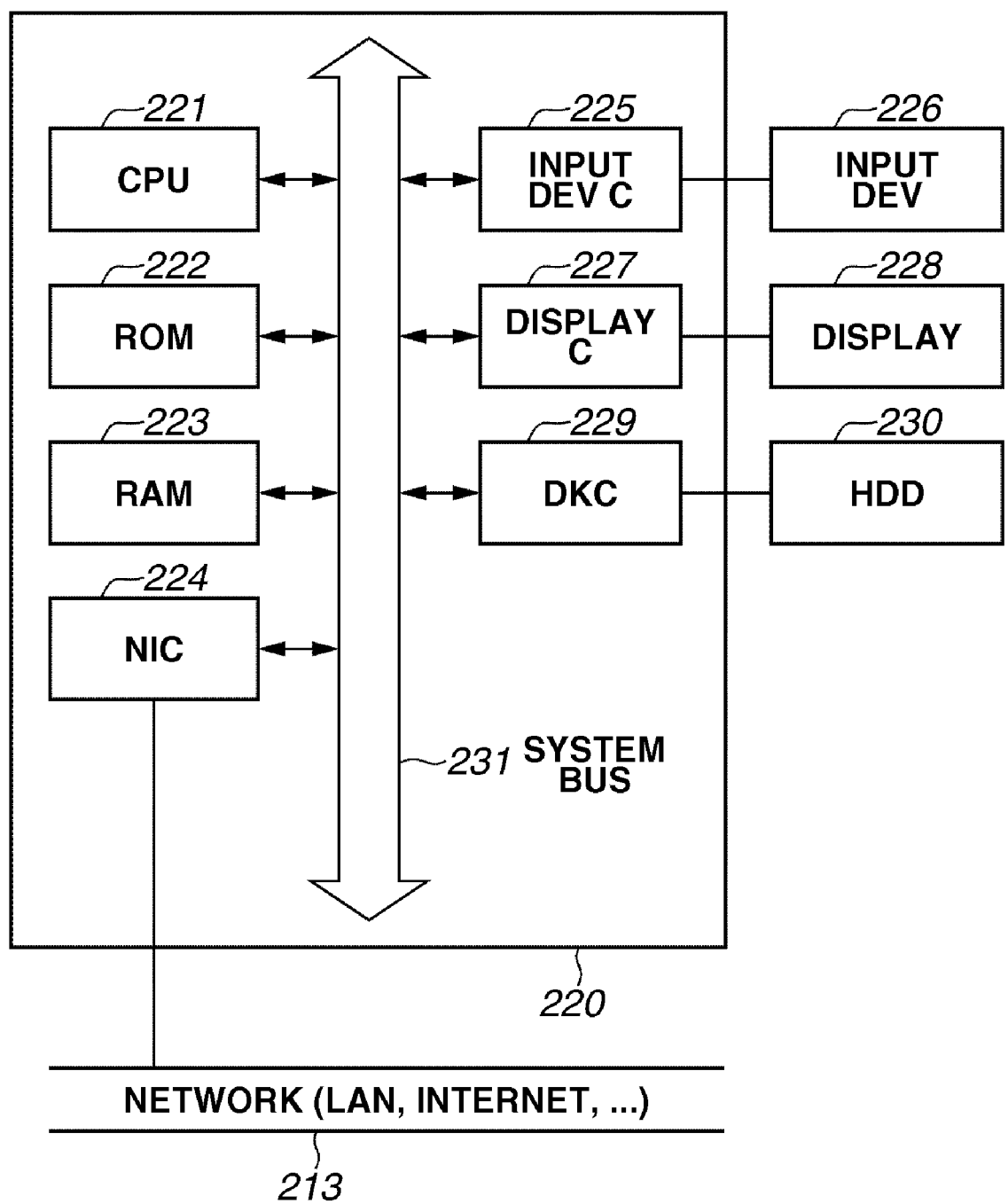
FIG. 2B illustrates an example of a hardware configuration of an information processing apparatus in the image processing system illustrated in FIG. 1.

FIG. 2B illustrates an example of a hardware configuration of an information processing apparatus in the image processing system illustrated in FIG. 1. The information processing apparatus includes the device management computer 102, the content log management server 103, and the content log viewing PC 104 in FIG. 1.

The information processing apparatuses include a general hardware configuration but have different operation clock and operating frequency according to their processing capacity.

Referring to FIG. 2B, an information processing apparatus 220 includes a CPU 221. The CPU 221 executes software stored on a ROM 222 or an HDD 230, for example. The CPU 221 controls, as a whole, each information processing apparatus connected to a system bus 231.

The HDD 230 can store association information. A RAM 223 functions as a main memory and a work area for the CPU 221. An external input controller (Input Dev C) 225 controls an instruction and an input given via an input unit (Input Dev) 226 which includes a keyboard or a mouse of the information processing apparatus.

A display controller (Display C) 227 controls a display of a display module (Display) 228 which includes a liquid crystal display, for example. A NIC 224 bidirectionally sends and receives data to and from other network apparatuses or file servers via a network 232 (equivalent to the network 105 in FIG. 1).

The HDD 230 is controlled by a disk controller (DKC) 229. The HDD 230, as necessary, can temporarily store information during data processing within the PC.

Figure 3:
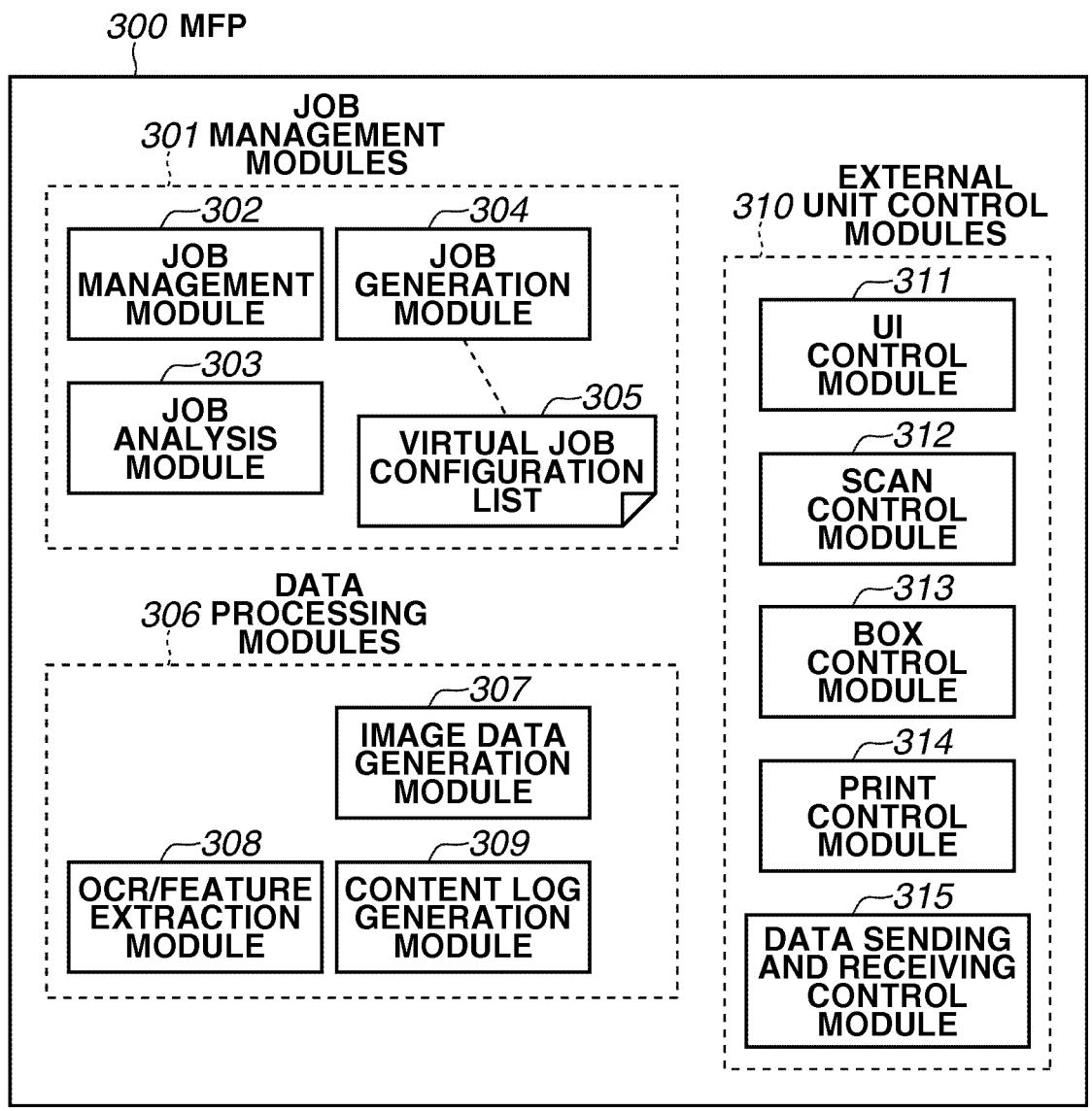
FIG. 3 illustrates an example of a software module configuration of the MFP illustrated in FIG. 1.

Now, a software module configuration of the MFPs 100 and 101 will be described. FIG. 3 illustrates an example of the software module configuration of the MFPs 100 and 101 illustrated in FIG. 1.

Referring to FIG. 3, an MFP 300 is controlled by a software module operating on a predetermined operating system. The MFP 300 implements the data flow pass control and function control as described above. The MFP 300 is equivalent to the MFP 100 or the MFP 101 illustrated in FIG. 1.

Job management modules 301 include software modules in a category for performing a generation and a management of a job input to the MFP 300 and an analysis of the received job.

A job generation module 304 generates a job based on information designated by a user via the operation unit 210. For example, the job generation module 304 generates a job according to each type of job such as a copy job, a facsimile transmission job, a scanned image sending job.

A job management module 302 manages the processing on the generated job. For example, when an error occurs during the processing, the job management module 302 determines appropriate recovery processing, displays a content of the desirable processing on the operation unit 210 and records a content of the error in a log.

In addition, the job management module 302 acquires image data handled during the processing on a job as a content log separately from the job data and stores the acquired image data (content log) in a predetermined storage area of the image processing apparatus 200 (the external memory 211, for example).

The content log is sent to the content log management server 103 at a predetermined timing under control of the job management module 302, so that the content logs can be transferred at once during nighttime in order to reduce the load on the network.

When a virtual job is designated, the job management module 302 refers to the virtual job configuration list 305 previously distributed by the device management computer 102 to determine which image processing apparatus constituting the virtual device acquires the content log. A result of determination is designated in the job data by the job generation module 304. An exemplary structure of the job data will be described below.

A job analysis module 303 analyzes the content of the received job data. The job generation module 304 generates a job according to a result of analysis by the job analysis module 303. The job management module 302 manages the processing of the generated job.

Data processing modules 306 include a group of software modules for performing image information processing and other processing which follow a flow of data processing of a designated job.

The data processing modules 306 include an image data generation module 307. The image data generation module 307 acquires image data from the scanner unit 212 and generates image data at a predetermined resolution and format. The data generation module 307 performs image data binarization processing and various filtering processing.

An optical character recognition (OCR)/feature extraction module 308 performs character recognition processing on image data to extract text information included in the image data. The OCR/feature extraction module 308 processes the image data in the unit of a page and further performs extraction of an image feature amount from each image block included in the page.

Here, the image block is extracted by discriminating a block including graphics from image data included in the page which is a mixture of text data and graphic data.

Further, data acquired by the image feature amount extraction processing is utilized for searching a similar image after acquiring specific image data. The processing for extracting the image feature amount is performed based on physical quantities such as information about the brightness and color included in the image data.

A content log generation module 309 generates image data to be processed, during a job as a content log in the unit of a job.

The content log is sent to the content log management server 103 to allow the system administrator to separately view the job content.

The content log generation module 309 includes control for integrating image data in a plurality of pages as one job and processing for acquiring a job attribute.

External unit control modules 310 include a group of software modules for controlling the units included in the image processing apparatus 200, namely, the printing unit 209, the scanner unit 212, the operation unit 210, the external memory 211, and the NIC 208.

In the external unit control modules 310, a user interface (UI) control module 311 controls the operation unit 210 and a scan control module 312 controls the scanner unit 212 are included.

A BOX control module 313 controls the external memory 211 and other units according to a flow for controlling a job, and thus implements the BOX function.

A print control module 314 controls the printing unit 209. A sending and receiving control module 315 controls the NIC 208 and other units according to a flow for controlling a job, and thus implements the send job function.

FIG. 4A illustrates an example of a job configuration list managed by the device management computer 102 illustrated in FIG. 1. The configuration list of real jobs and virtual jobs are illustrated as a table in FIG. 4A.

Referring to FIG. 4A, types of jobs are classified in a real job 400 and a virtual job 401 in a row in the table. Further, in columns, combinations 402 of the image processing apparatuses that perform job generation and job performing are described.

The combination 402 of the image processing apparatuses that perform job generation and job execution corresponds to a combination of an MFP that generates a virtual job and an MFP that finally executes the virtual job in a case of the virtual job 401.

The real job 400 is processed by one image processing apparatus. Thus, no item such as the combination of image processing apparatuses exists in the real job 400. In order to identify the image processing apparatus, a device name or a model number is designated.

The real job 400 refers to image information processing whose job processing flow can be completely implemented within one MFP. For example, a "normal-copy" job and a "pdl-print" job are real jobs 400.

On the other hand, the virtual job 401 refers to image information processing that is cooperatively performed by a plurality of MFPs to complete a job processing flow. For example, in the present exemplary embodiment, a "remote-copy" job, a "remote-fax" job, a "pull-print" job, and "push-scan" job are virtual jobs 401. However, various types of jobs other than those described above can be processed by the present exemplary embodiment.

In the present exemplary embodiment, in the example illustrated in FIG. 4A, the device name and the model number for identifying an image processing apparatus are collectively referred to as a device "T" or a device "R". A device "T" refers to an inexpensive consumer device, for example, a device that does not include a facsimile transmission function and corresponds to an MFP whose external memory 211 has a small capacity.

On the other hand, a device "R" includes a facsimile transmission function and has the external memory 211 with large capacity. A device "R" has a capacity large enough to be used as a central machine in an office.

Further, in FIG. 4A, an "external agent" is an external server or an external MFP that performs a content log acquisition function and other processing.

In a case 403 in which a "normal-copy" job or a "pdl-print" job is performed on a device "T" during the real job 400, no external memory 211 for acquiring and storing the content log is provided. In a case where no external memory 211 for acquiring and storing the content log is provided, job data is temporarily transferred to an external agent to perform necessary processing during the real job 400.

In the virtual job 401, a combination 404 is an example of a virtual job "remote-copy". In the combination 404, a device "T2" performs the virtual job and a device "T1" generates the virtual job.

In the combination 404, the virtual job generation device and a virtual job performing device are mutually different, but an external agent is used for performing the content log acquisition processing because the devices "T1" and "T2" both have low performance.

Similarly, in the virtual job 401, a combination 405 is an example of a virtual job "remote-copy". In the combination 405, the virtual job is performed by a combination of devices "T" and "R", for example. Further, in the combination 405, the device "R" that performs the virtual job performs the content log acquisition processing.

In the example illustrated in FIG. 4A, underlined device "R", "T", or external agent performs the content log acquisition processing. In the case of the combination 405, the device "R" that performs the virtual job is underlined.

Similarly, in the virtual job 401, a combination 406 is an example of a virtual job "remote-copy". In the combination 406, the virtual job is performed by a combination of the devices "R" and "T". In the combination 406, the virtual job performing device "T" does not have a capacity for performing the content log acquisition processing. Thus, the virtual job generation device "R" performs the content log acquisition processing.

In addition, in the virtual job 401, a combination 407 is an example of a virtual job "remote-copy". In the combination 407, the virtual job is performed by a combination of devices "R1" and "R2", for example.

In the combination 407, the virtual job is performed by the combination of the devices "R1" and "R2". Accordingly, either of the devices can perform the content log acquisition processing.

Thus, in the combination 407, the system administrator can arbitrarily designate either of the devices "R1" and "R2" in a configuration list for the virtual job on the device management computer 102.

Moreover, in the combination 407, the system administrator can designate the virtual job generation device "R1" to perform the content log acquisition processing while the virtual job performing device "R2" performs other processing such as OCR processing.

As discussed above, the configuration list corresponding to the virtual job illustrated in FIG. 4A is previously generated by the system administrator on the device management computer 102 and stored thereon. The device management computer 102 distributes the stored device list to each of the MFPs on the network such as the MFP 100 and the MFP 101 at a timing described below.

The device management computer 102 automatically distributes the job configuration list to each MFP on the network. Further, the configuration list corresponding to the virtual job can be updated at any time and as many times as desired. The configuration list updating processing will be described in detail below.

In the example illustrated in FIG. 4A, the virtual job and the real job can be separately managed as mutually different device configuration lists.

The job configuration list is distributed from the device management computer 102 to each MFP via the network 105. The timing of the distribution can be set in advance by the system administrator such as at a time immediately after the generation and storage of the virtual job configuration list or at specific time-of-day, every other day, or late at night of any weekday.

The above-described device configuration list needs to be periodically updated because a status of resources of each MFP varies according to an operation state of the MFP on the network. In this regard, it is useful that the device management computer 102 searches for the status of the resources of each MFP and update the device configuration list.

It is useful that the device that acquires the content log is dynamically changed for each virtual job type, such as a "remote-copy" job, a "remote-fax" job, a "pull-print" job, and a "push-scan" job.

For example, in the combination 407, the combination of the devices "R1" and "R2" perform the virtual job and both devices can perform the content log acquisition processing. In this case, the device management computer 102 can determine the type of the virtual job and generate a device configuration list suitable to the determined virtual job type.

Processing for updating the virtual job device configuration list will be described in detail below.

The device management computer 102 communicates with the image processing apparatus on the network 105 by a predetermined protocol, searches for the resource status of each image processing apparatus, and dynamically updates the device configuration list stored therein. The image processing apparatus includes the MFPs 100 and 101.

The capacity of an external memory such as a hard disk varies according to the processing of the job. Accordingly, it is not useful to uniquely determine the image processing apparatus to store the content log because the image processing apparatus may shift to an inappropriate status as a content log acquisition device corresponding to variation of the capacity.

In the present exemplary embodiment, the device management computer 102 periodically or dynamically monitors a status of traffic on the network to search for the variation in the resource of each image processing apparatus and updates the device configuration list suitable for the current status of the image processing apparatus.

Thus, each image processing apparatus can refer to the latest device configuration list if a request for a virtual job such as a remote copy is issued and determine a device that stores the content log according to the status of the resource of each image processing apparatus.

In updating the device configuration list, the device management computer 102 acquires free capacity of the HDD of each image processing apparatus. Then, the device management computer 102 compares the acquired HDD free capacities to determine the image processing apparatus that stores the content log.

Accordingly, even when an image processing apparatus that is essentially suitable to store the content log temporarily runs out of the HDD capacity depending on the processing status of the job, the present exemplary embodiment can determine a candidate of a device that is best suitable for storing the content log.

However, a method for determining the device that stores the content log can be based on a condition that is different from the above-described condition because the resource used in each image processing apparatus may differ at the time of acquiring the content log. More specifically, the load on the resource used in each image processing apparatus may differ due to the difference in the type of the job such as the virtual copy job or virtual send job.

Figure 4B:
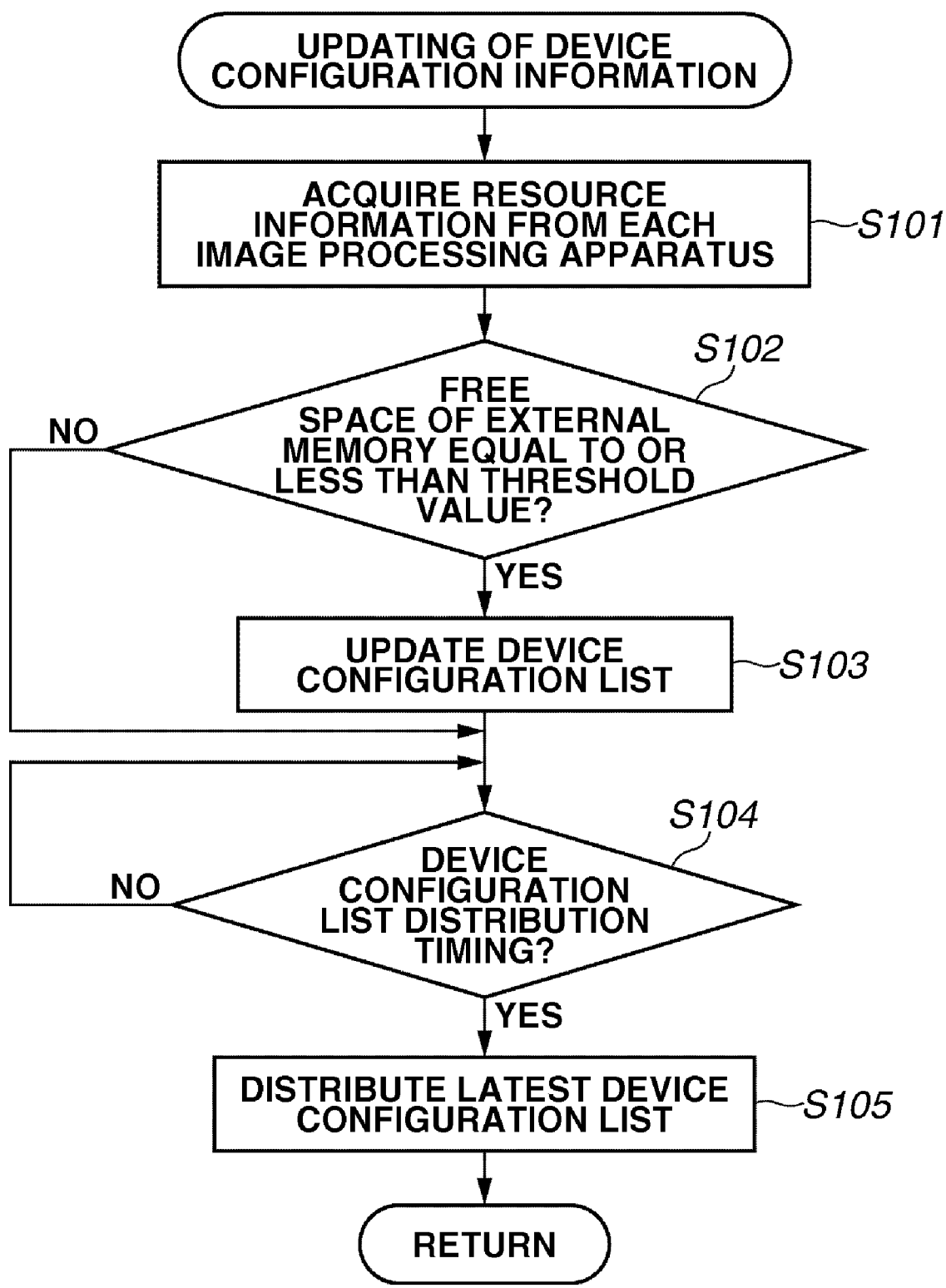
FIG. 4B is a flowchart illustrating an example of data processing performed by an information processing apparatus according to an exemplary embodiment of the present invention.

FIG. 4B is a flowchart illustrating an example of data processing performed by the information processing apparatus according to the present exemplary embodiment. According to the exemplary processing illustrated in FIG. 4B, the device management computer 102 performs updating of the device configuration list. Each step of the processing can be implemented by the CPU of the device management computer 102 loading and executing a control program from an HDD onto a RAM.

Referring to FIG. 4B, in step S101, the CPU of the device management computer 102 acquires resource information from each image processing apparatus according to the schedule previously set by the system administrator. In acquiring the resource information, the device management computer 102 broadcasts a packet for acquiring the resource information including the free capacity of the external memory of each image processing apparatus. The device management computer 102 can acquire error information (such as "no toner", "no ink", or "no paper") together from each image processing apparatus.

In step S102, the CPU of the device management computer 102 determines whether any external memory of each image processing apparatus has a free capacity less than or equal to a previously set threshold value based on the resource information sent from each image processing apparatus as a reply. Here, the system administrator can dynamically set different values or fixed values for the threshold value according to the current system environment.

If it is determined in step S102 that no external memory has a free capacity less than or equal to the threshold value (NO in step S102), then the processing advances to step S104. On the other hand, if it is determined in step S102 that an external memory having a free capacity less than or equal to the threshold value exists (YES in step S102), then the processing advances to step S103.

In step S103, the CPU of the device management computer 102 changes the image processing apparatus whose external memory has a free capacity less than or equal to the threshold value and having been designated as the content log acquisition device and updates the device configuration list.

In step S104, the CPU of the device management computer 102 determines whether it is timing for distributing the updated device configuration list. The timing for distributing the device configuration list can be set by the system administrator.

If it is determined in step S104 that it is the timing for distributing the device configuration list (YES in step S104), then the processing advances to step S105. In step S105, the CPU of the device management computer 102 distributes the latest device configuration list to each image processing apparatus. Then, the processing ends.

For example, in the combination 407 illustrated in FIG. 4A, the device configuration list in which different devices are underlined is distributed to the image processing apparatus.

In the case where each image processing apparatus performs a virtual job according to the latest device configuration list, the device management computer 102 determines which image processing apparatus acquires the content log. On the other hand, if it is determined in step S104 that it is not the timing for distributing the device configuration list (NO in step S104), the process will remain in step S104 until it is determined that it is the timing for distributing the device configuration list.

FIG. 5 is a flow chart illustrating an example of data processing performed by the image processing apparatus according to the present exemplary embodiment. In FIG. 5, each of the virtual job generation device and the virtual job performing device performs processing on the log during the "remote-copy" processing.

Note that processing in steps S501 through S512 are performed by the virtual job generation device during the "remote-copy" processing, and processing in steps S521 through S526 are performed by the image processing apparatus that performs the virtual job during the "remote-copy" processing. Furthermore, each step in the flow chart of FIG. 5 can be implemented by a CPU of each image processing apparatus loading and executing a control program from a ROM or an HDD onto a RAM.

In the following description, it is supposed that the MFP that generates a virtual job is an image processing apparatus A (see FIG. 5) and the other MFP that performs the virtual job is an image processing apparatus B (see FIG. 5).

The image processing apparatus A starts a flow for the job generation processing based on a virtual job designated by the system administrator via the operation unit 210. Referring to FIG. 5, in step S501, the CPU of the image processing apparatus A refers to a value input to the operation unit 210 to determine which of a real job or a virtual job the type of the designated job is.

If the CPU of the image processing apparatus A determines in step S501 that the type of the designated job is a virtual job (YES in step S501), then the processing advances to step S502. In step S502, the CPU of the image processing apparatus A refers to the virtual job configuration list illustrated in FIG. 4A and acquires processing information for the content log acquiring device.

On the other hand, if the CPU of the image processing apparatus A determines in step S501 that the type of the designated job is a normal real job (NO in step S501), then the processing advances to step S511. In step S511, the CPU of the image processing apparatus A performs the job (scanning and printing) according to a conventional processing flow. More specifically, the CPU of the image processing apparatus A acquires the image data to be scanned and prints the acquired image data. In step S512, the CPU of the image processing apparatus A acquires the content log for the real job. Then, the processing advances to step S509.

When the CPU of the image processing apparatus A determines in step S501 that the type of the designated job is a virtual job (YES in step S501), then the processing advances to step S502. In step S502, the CPU of the image processing apparatus A refers to the virtual job configuration list based on the designation for the virtual job and acquires processing information for the log acquiring device. Then, the processing advances to step S503.

In step S503, the CPU of the image processing apparatus A determines whether the image processing apparatus A acquires the content log or the virtual job performing image processing apparatus B acquires the content log. The CPU of the image processing apparatus A determines which of the image processing apparatus A and the image processing apparatus B acquires the content log based on the setting set in the job configuration list (FIG. 4A). Here, the image processing apparatus A is a job issuing device.

If the CPU of the image processing apparatus A determines in step S503 that the image processing apparatus A acquires the content log (YES in step S503), then the processing advances to step S507. On the other hand, if the CPU of the image processing apparatus A determines in step S503 that the image processing apparatus B acquires the content log (NO in step S503), then the processing advances to step S504.

In step S507, the CPU of the image processing apparatus A performs the scanning for the "remote-copy" processing and generates scan data (image data) corresponding to the virtual job. In step S508, the image processing apparatus A acquires the content log.

On the other hand, in the case of processing advances to step S504, the image processing apparatus B acquires the content log. Accordingly, in step S504, the CPU of the image processing apparatus A performs the scanning for the "remote-copy" processing and generates scan data (image data) corresponding to the virtual job. The image data is generated as a result of the scanning processing performed by the image processing apparatus B.

In step S505, the CPU of the image processing apparatus A sets the scan data corresponding to the virtual job as virtual job data then sets the processing information for the image processing apparatus B in the virtual job data. Then, the processing advances to step S506. The virtual job data includes image data of the scanned original document, information about the device that has performed the scanning, and the processing information for the image processing apparatus B. The processing information includes the instruction for causing the image processing apparatus B to acquire the content log.

In step S506, the CPU of the image processing apparatus A sends the generated virtual job data to the image processing apparatus B. Meanwhile, in step S521, the CPU of the image processing apparatus B receives the virtual job data from the image processing apparatus A and analyzes the received virtual job data.

In step S522, the CPU of the image processing apparatus B analyzes the processing information in the virtual job data to determine whether the image processing apparatus B is designated to acquire the content log. Whether the image processing apparatus B acquires the content log is determined by the job analysis module 303 (of the image processing apparatus B) (FIG. 3) based on a result of the analysis on the virtual job data.

If the job analysis module 303 determines in step S522 that the image processing apparatus B is designated to acquire the content log (YES in step S522), then the processing advances to step S523. In step S523, the CPU of the image processing apparatus B prints the virtual job data. In this case, if the job data includes a designation for finishing, the image processing apparatus B performs the finishing processing in addition to the print processing.

In step S524, the acquisition of the content log is performed under control of the content log generation module 309.

On the other hand, if the CPU of the image processing apparatus B determines in step S522 that it is not necessary for the image processing apparatus B to acquire the content log (NO in step S522), then the processing advances to step S526. If the image processing apparatus A has already acquired the content log, the virtual job data includes information indicating that it is not necessary to acquire the content log.

Accordingly, in step S526, the image processing apparatus B prints the virtual job data. When the virtual job data is completely printed, the processing advances to step S525. In step S525, the CPU of the image processing apparatus B performs status processing for monitoring an end of the processing on the virtual job data under control of the job management module 302.

If the processing on the virtual job data has been normally completed as status processing, then the job management module 302 notifies the image processing apparatus B of normal completion. On the other hand, if the processing on the virtual job data has abnormally ended, then the job management module 302 displays a recovery notification message on the operation unit 210. Then, the processing ends.

Meanwhile, in step S509, the CPU of the image processing apparatus A starts the status processing on the job generation apparatus upon receiving status notification from the image processing apparatus B.

In step S510, the CPU of the image processing apparatus A clears the processing information for the virtual job performing device using the job management module 302. Then, the processing ends.

The processing information for the virtual job performing device is stored in a predetermined memory area of the MFP managed by the job management module 302 and cleared after the job ends.

Figure 6:
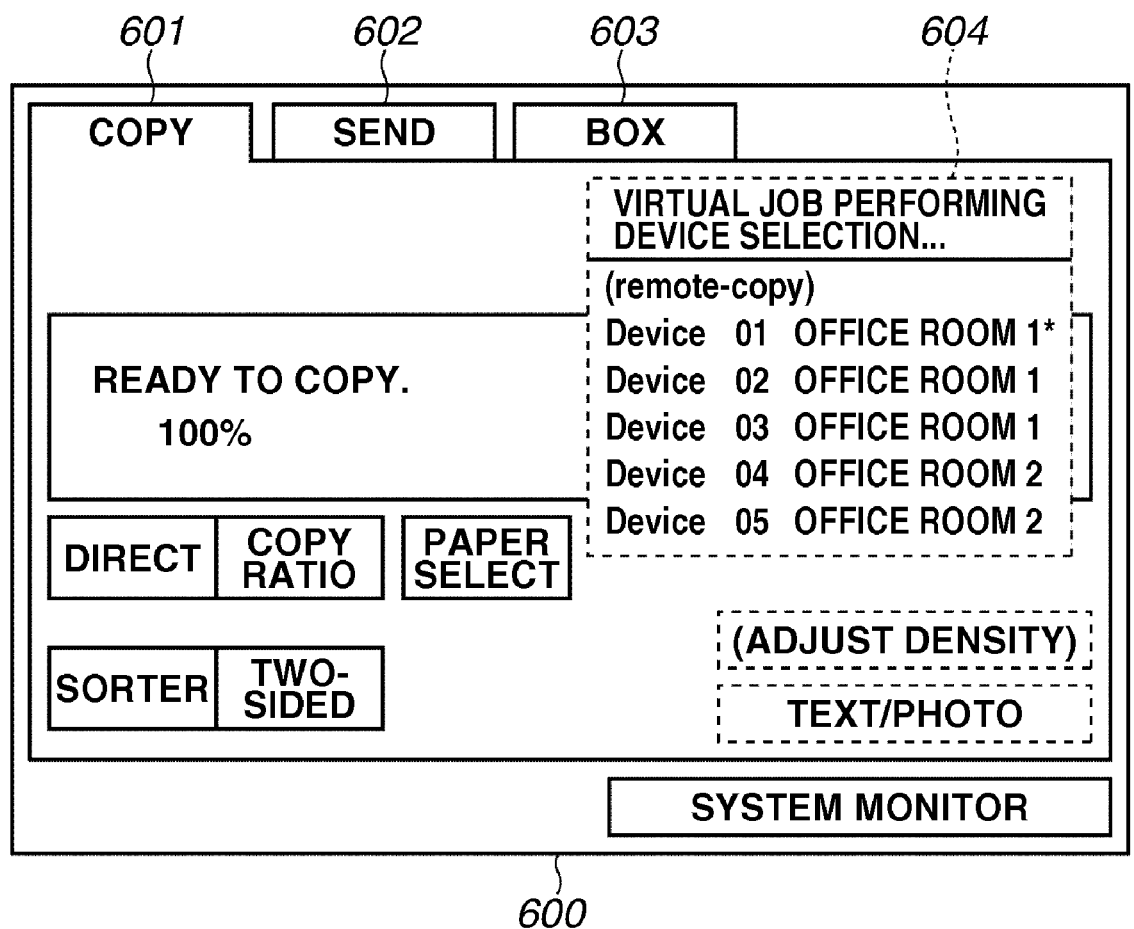
FIG. 6 illustrates an example of a user interface displayed on an operation unit of the MFP illustrated in FIG. 1.

FIG. 6 illustrates an example of a user interface displayed on an operation unit of the MFPs 100 and 101 (FIG. 1). In the present exemplary embodiment, the screen configurations of the user interfaces of the MFPs 100 and 101 are the same. However, the configurations of the screen design can be different as long as the operation units of the MFPs 100 and 101 can display the similar functional information. Furthermore, the user interface of the present exemplary embodiment is displayed on the operation unit 210 (FIG. 2A).

Referring to FIG. 6, the operation unit includes numeric keys, a start key, a stop key (which are not illustrated), and a liquid crystal operation panel.

The user can designate a function used for the various jobs performed on the MFP via a liquid crystal operation panel 600.

Each job to be performed by the MFP is classified into a category as a tab displayed on the liquid crystal operation panel 600. For example, the liquid crystal operation panel 600 includes a copy tab 601, a send tab 602, and a BOX tab 603.

When the user performs copy processing, the user selects the copy tab 601, designates a paper size, a copy ratio, a density, whether to perform finishing, and the number of copies, then presses a start key (not illustrated).

Further, the user can press the send tab 602 to give an instruction for sending the scanned data via an E-mail or a facsimile. A virtual job can be designated via the liquid crystal operation panel 600.

In the case of the virtual job, it is necessary for the user to select an image processing apparatus that performs the virtual job.

For example, when the user presses a virtual job performing device selection key 604 in the screen for the copy tab 601, a list of available devices are displayed and the user can freely select therefrom an arbitrary image processing apparatus that performs a virtual job. In the example illustrated in FIG. 6, Device 01 through Device 05 are displayed as selectable devices that perform a virtual job with respect to the "remote-copy" processing.

Further, when the user presses the virtual job performing device selection key 604, a list of the image processing apparatuses is displayed by referring to the virtual job configuration list previously distributed under display control of the CPU 201. More specifically, the CPU 201 executes the functions of the job management module 302 and the UI control module 311 to refer to the previously distributed virtual job configuration list and the image processing apparatuses are displayed as a list at a predetermined position on the liquid crystal operation panel 600.

In the example illustrated in FIG. 6, when the user presses a selection key 604 for selecting the virtual job performing device, the image processing apparatus that the user currently operates is displayed with an asterisk ("*") among the image processing apparatuses. The image processing apparatus marked by an asterisk is a virtual job issuing device.

When the user selects the Device 03, for example, as a virtual job performing device, the virtual device that performs the "remote-copy" processing as a virtual job includes the Device 01 and the Device 03.

A selection key 604 for selecting a virtual job performing device is disposed on a display screen which is displayed when the user selects the send tab 602 or the BOX tab 603. The user can designate a corresponding virtual job and virtual device within the job category of the selected tab. For example, via the screen for the send tab 602, the user can select "remote-fax" processing.

Figure 7:
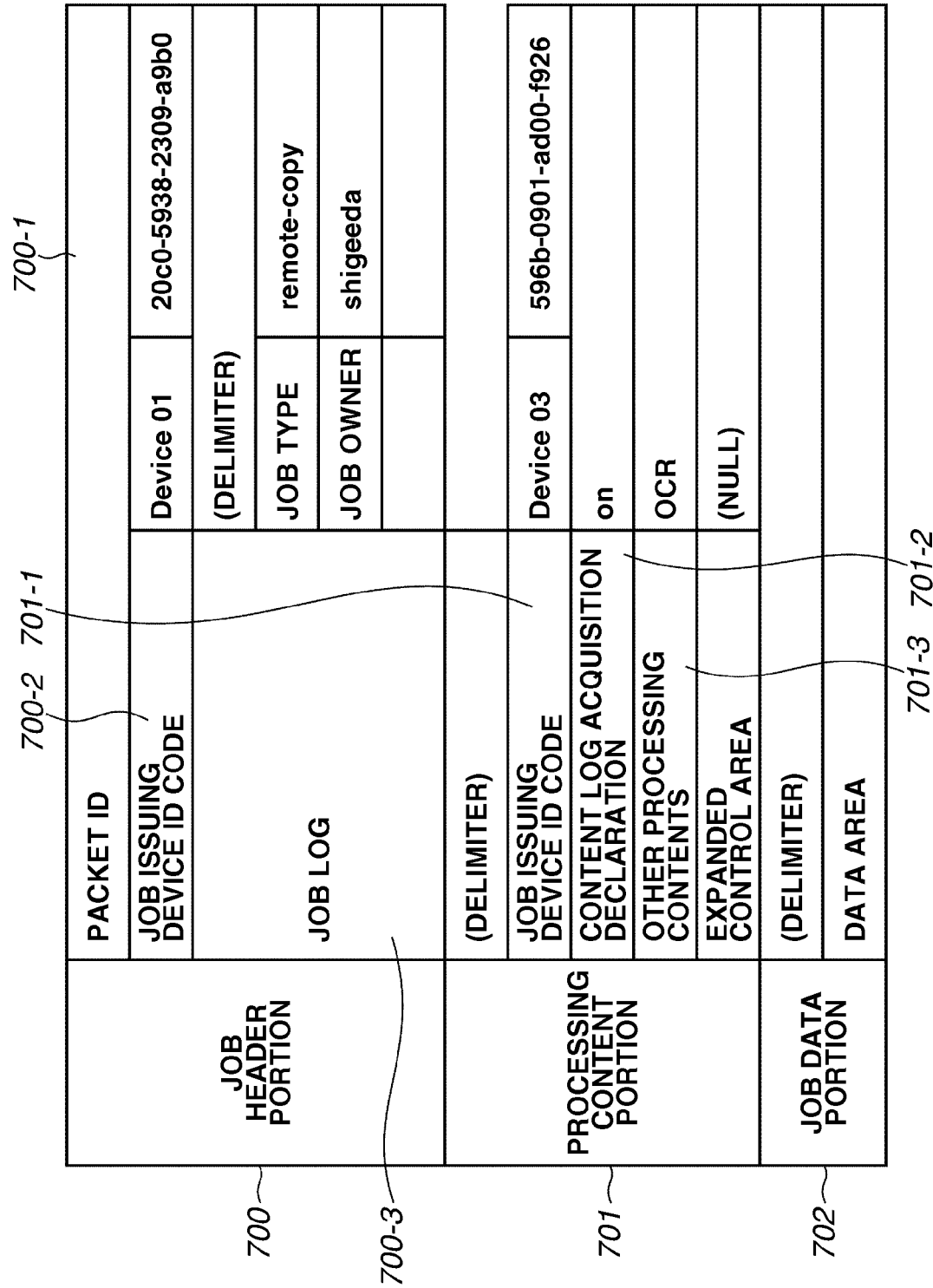
FIG. 7 illustrates an example of a structure of job data processed by the image processing apparatus according to an exemplary embodiment of the present invention.

FIG. 7 illustrates an example of a structure of job data processed by the image processing apparatus according to the present exemplary embodiment. The job data is generated by the job generation module 304 (FIG. 3).

Referring to FIG. 7, if the designated job is a virtual job for performing a remote copy, the user can designate a device that acquires the content log together with other processing (OCR processing, for example).

The job data includes a job header portion 700, a processing content portion 701, and a job data portion 702.

The job header portion 700 includes various attributes such as a packet ID 700-1 for identifying a job performed by the MFP, a job issuing device ID code 700-2 related to the job, and a job log 700-3. The job log 700-3 includes a job type and a job owner.

The processing content portion 701 is embedded with information such as an ID code 701-1 for identifying a job performing device designated in the virtual job configuration list, a content log acquisition declaration 701-2, and other processing contents 701-3. The other processing contents 701-3 are information for designating the OCR processing. In this example, the Device 03, which is a virtual device, is designated to acquire the content log. Thus, the content log acquisition declaration 701-2 is set "on".

As described above, the job data illustrated in FIG. 7 includes designation to cause the Device 03 (whose ID code 701-1 is "596b-0901-ad00-f926"), which is a virtual device, to acquire the content log and perform the OCR processing.

The job data portion 702 stores a control code for performing the job itself and image data.

FIG. 8 illustrates an example of a content log managed by the content log management server 103 illustrated in FIG. 1.

In the present exemplary embodiment, the content log generated in one job includes a job log equivalent to various job attributes, image data, an image feature amount for searching an image, and text data.

Referring to FIG. 8, a job attribute category ("JOB_LOG") 800 is an example of job attributes included in one content log. The job attribute category 800 includes various job attributes such as a device type, a job type, and a job start date and time.

The image data included in the content log is managed by the content log management server 103 in an image data category ("IMG_DAT") 801. If image data for a plurality of pages is included in one job, the content log management server 103 manages the image data together as one job.

The image feature amount extracted from image data is stored on the content log management server 103 as an image feature amount category (IMG_CHAR) 802. The image feature amount is utilized to search for similar images.

Further, in a case where the OCR processing is designated, text data extracted from the image data exists. Thus, the text data is managed by the content log management server 103 as a text category (TXT_DAT) 803.

The user of the content log management system searches the job log category 800, the image feature amount category 802, and the text category 803 managed by the content log management server 103 via the content log viewing PC 104. A result of the search is displayed on the display device of the content log viewing PC 104.

Display items displayed on the display device of the content log viewing PC 104 include various job log attributes, the image data, and the text data. Further, with respect to the display format, the items can be displayed as a list for each job. Alternatively, page image thumbnails can be used as preview images.

Figure 9:
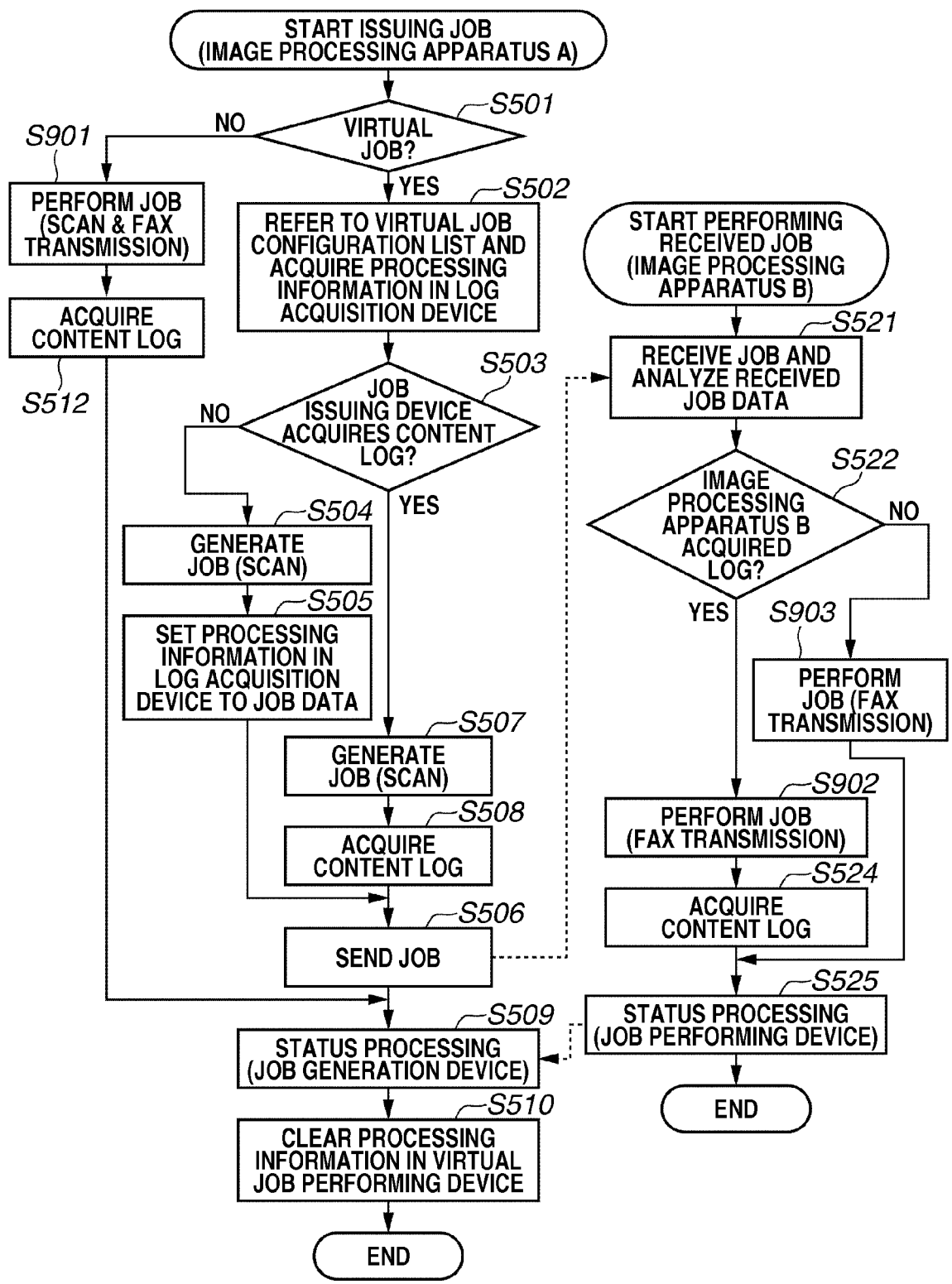
FIG. 9 is a flow chart illustrating an example of another data processing performed by the image processing apparatus according to an exemplary embodiment of the present invention.

FIG. 9 is a flow chart illustrating an example of another data processing performed by the image processing apparatus according to the present exemplary embodiment. The example in FIG. 9 illustrates the processing on the log for generating and performing a virtual job in the case of performing "remote-fax" processing. The same step as that in FIG. 5 is provided with a same step number as in FIG. 5.

Referring to FIG. 9, processing in step S901 corresponds to processing performed by a virtual job issuing device at the time of performing a "remote-fax" job. Processing in steps S902 and S903 correspond to processing performed by a virtual job performing device at the time of performing a "remote-fax" job. Further, each step of the processing can be implemented by a CPU of each device that loads and executes a control program from a ROM or an HDD onto a RAM.

The flow of processing is basically similar to the "remote-copy" job illustrated in FIG. 5. As processing different from FIG. 5, instead of printing processing in FIG. 5 (steps S511, S523, and S526), facsimile transmission processing (steps S901 through S903) is performed in the "remote-fax" job illustrated in FIG. 9. Further, each facsimile transmission processing is controlled by the sending and receiving control module 315 (FIG. 3).

With respect to other processing performed on the virtual job, the basic processing is similar to that illustrated in FIGS. 5 and 9 and the content of the processing differs according to MFP control module which is to be used.

In the present exemplary embodiment, there may be a case where an image processing apparatus that is determined not to acquire the content log should acquire the content log. More specifically, if an image processing apparatus which cooperatively operates with the image processing apparatus to perform a virtual job cannot perform a virtual job or acquire the content log due to an error, the image processing apparatus that is determined not to acquire the content log acquires the content log. In this case, when the image processing apparatus receives an error of virtual job performing from the cooperatively operating image processing apparatus, the image processing apparatus which is a virtual job sending source can instead acquire the content log, based on the received log.

In addition, as an expansion of the present exemplary embodiment, the image processing apparatuses that can operate in cooperation with one another or via the management computer can update each other's error statuses and statuses of the memory storing the content log in real time.

With this configuration, the image processing apparatus that is determined in step S503 to acquire no content log, can acquire the content log by checking the status of the image processing apparatus which is a destination of the virtual job. In this case, the virtual job includes information indicating that the content log has been acquired. Accordingly, it can be prevented to dually acquire the content log even when the other image processing apparatus is restored from an error during performing the virtual job.

Second Exemplary Embodiment

The configuration of a data processing program that can be read by an image processing system according to a second exemplary embodiment of the present invention is described with reference to memory maps illustrated in FIG. 10 and FIG. 11.

FIG. 10 is a memory map of a storage medium storing various types of data processing programs that can be read by the image processing apparatus according to the present exemplary embodiment of the present invention.

FIG. 11 is a memory map of a storage medium storing various types of data processing programs that can be read by the information processing apparatus according to the present exemplary embodiment of the present invention.

Although not shown in FIG. 10 and FIG. 11, information for managing the programs stored in the storage medium such as version information and information about a creator of a program can be stored in the storage medium. In addition, information that depends on an operating system (OS) of an apparatus that reads the program, such as an icon for identifying and displaying the program, can be stored in the storage medium.

In addition, data that is subordinate to the various programs is managed in a directory of the storage medium. A program for installing the various programs on a computer and a program for decompressing the compressed program in a case where an installed program is compressed can be stored in the storage medium.

Moreover, the functions according to the above-described exemplary embodiments shown in FIGS. 4B, 5, and 9 can be implemented by a host computer using a program that is externally installed. The present invention is applied to a case where a group of information including a program is supplied to an output device from a storage medium such as a compact disk-read only memory (CD-ROM), a flash memory, and a floppy disk (FD) or from an external storage medium via a network.

The present invention can also be achieved by providing a system or an apparatus with a storage medium storing program code of software implementing the functions of the exemplary embodiments and by reading and executing the program code stored in the storage medium with a computer of the system or the apparatus (a CPU or a micro processing unit (MPU)).

In this case, the program code itself, which is read from the storage medium, implements the novel functions of the present invention, and accordingly, the storage medium storing the program code constitutes the present invention.

Accordingly, the program can be configured in any form, such as object code, a program performed by an interpreter, and script data supplied to an OS.

As the storage medium for supplying such program code, a floppy disk, a hard disk, an optical disk, a magnetooptic disk (MO), a CD-ROM, a compact disk recordable (CD-R), a compact disk rewritable (CD-RW), a magnetic tape, a non-volatile memory card, a ROM, and a digital versatile disk (DVD, DVD-recordable (DVD-R), DVD-rewritable (DVD-RW)), for example, can be used.

In this case, the program code itself, which is read from the storage medium, implements the function of the exemplary embodiments mentioned above, and accordingly, the storage medium storing the program code constitutes the present invention.

The above program can be supplied by connecting to a web site on the Internet by using a browser of a client computer and by downloading the program according to the exemplary embodiments of the present invention or a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can be supplied by distributing a storage medium such as a CD-ROM and the like which stores the program according to the present invention after an encryption thereof, while allowing a user who satisfies a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-211757 filed Aug. 15, 2007, which is hereby incorporated by reference herein in its entirety.

What is claimed is:

1. A particular image processing apparatus which is included in a virtual device that is constructed of a plurality of real image processing apparatuses and can cooperatively utilize functions of the plurality of real image processing apparatuses, the particular image processing apparatus comprising:
   a determination unit configured to determine, by referring to virtual job configuration information, whether to acquire a content log on the particular image processing apparatus, in performing a virtual job including image forming processing which is processed by cooperatively using the functions of the plurality of real image processing apparatuses included in the virtual device; and
   an acquisition unit configured to acquire the content log of the virtual job if the determination unit determines that the particular image processing apparatus is to acquire the content log,
   wherein the acquisition unit acquires the content log of the virtual job according to a status of a storage area for the content log in another image processing apparatus included in the virtual device when an error has occurred in said another image processing apparatus, even if the determination unit does not determine that the particular image processing apparatus is to acquire the content log, and
   wherein the content log is historical information including attribute information of the virtual job and image data processed based on the virtual job or extracted data from the image data.

2. The particular image processing apparatus according to claim 1, wherein the determination unit determines whether to acquire the content log on the image processing apparatus based on information for determining an apparatus that acquires the content log of the virtual job according to a type of the virtual job.

3. The particular image processing apparatus according to claim 1, further comprising a receiving unit configured to receive information for determining an apparatus that acquires the content log of the virtual job according to the type of the virtual job from an external apparatus, wherein the information for determining the apparatus that acquires the content log of the virtual job according to the type of the virtual job is updated by the external apparatus based on a status of the plurality of image processing apparatuses.

4. The particular image processing apparatus according to claim 1, further comprising:
   a performing unit configured to perform processing, by the particular image processing apparatus, according to the virtual job; and
   a sending unit configured to set a result of the processing performed by the performing unit to the virtual job and send the virtual job to another image processing apparatus.

5. A method for controlling a particular image processing apparatus which is included in a virtual device that is constructed of a plurality of real image processing apparatuses and can cooperatively utilize functions of the plurality of real image processing apparatuses, the method comprising:
   determining, by referring to virtual job configuration information, whether to acquire a content log on the particular image processing apparatus, in performing a virtual job including image forming processing which is processed by cooperatively using the functions of the plurality of real image processing apparatuses included in the virtual device;
   acquiring the content log of the virtual job in response to determining that the particular image processing apparatus is to acquire the content log; and
   acquiring the content log of the virtual job according to a status of a storage area for the content log in another image processing apparatus included in the virtual device when an error has occurred in said another image processing apparatus, even if the particular image processing apparatus is not determined to acquire the content log.

6. The method according to claim 5, wherein the determination on whether the particular image processing apparatus acquire the content log is based on information for determining an apparatus that acquires the content log of the virtual job according to a type of the virtual job.

7. The method according to claim 5, further comprising receiving information for determining an apparatus that acquires the content log of the virtual job according to the type of the virtual job from an external apparatus, wherein the information for determining the apparatus that acquires the content log of the virtual job according to the type of the virtual job is updated by the external apparatus based on a status of the plurality of image processing apparatuses.

8. The method according to claim 5, further comprising:
   performing processing, by the particular processing apparatus, according to the virtual job; and
   setting a result of the processing to the virtual job and sending the virtual job to another image processing apparatus.

9. A computer-readable storage medium storing instructions that cause a computer to perform the method according to claim 5.

* * * * *